(12) United States Patent
Moriya et al.

(10) Patent No.: US 10,981,523 B2
(45) Date of Patent: Apr. 20, 2021

(54) IN-VEHICLE NETWORK SYSTEM AND COMMUNICATION SETTING METHOD

(71) Applicant: Toyota Jidosha Kabushiki Kaisha, Toyota (JP)

(72) Inventors: Tomokazu Moriya, Tokyo-to (JP); Yoshinori Kakiya, Choufu (JP); Masakazu Hattori, Kawasaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 210 days.

(21) Appl. No.: 16/256,399

(22) Filed: Jan. 24, 2019

(65) Prior Publication Data
US 2019/0232892 A1 Aug. 1, 2019

(30) Foreign Application Priority Data
Jan. 26, 2018 (JP) ............................. JP2018-011914

(51) Int. Cl.
| | |
|---|---|
| *B60R 16/02* | (2006.01) |
| *B60R 16/023* | (2006.01) |
| *G06F 9/38* | (2018.01) |
| *H04L 12/46* | (2006.01) |
| *H04L 12/66* | (2006.01) |
| *H04L 12/40* | (2006.01) |

(52) U.S. Cl.
CPC .......... *B60R 16/023* (2013.01); *G06F 9/3877* (2013.01); *H04L 12/462* (2013.01); *H04L 12/4625* (2013.01); *H04L 12/66* (2013.01); *H04L 2012/40273* (2013.01)

(58) Field of Classification Search
CPC .................................................. B60R 16/023
See application file for complete search history.

(56) References Cited

U.S. PATENT DOCUMENTS

| | | | | |
|---|---|---|---|---|
| 5,130,981 A | * | 7/1992 | Murphy | .............. H04L 12/4625 370/401 |
| 7,694,015 B2 | * | 4/2010 | Yoshiuchi | ............. H04L 63/083 709/244 |
| 9,635,151 B2 | * | 4/2017 | Shimomura | ............ H04L 69/40 |
| 10,148,485 B2 | * | 12/2018 | Frail | ..................... H04L 41/042 |
| 10,783,233 B2 | * | 9/2020 | Fujimoto | ............ H04L 63/0853 |
| 2008/0117898 A1 | * | 5/2008 | Davidson | ................ H04L 12/66 370/389 |

(Continued)

FOREIGN PATENT DOCUMENTS

| | | |
|---|---|---|
| JP | 2009161103 A | 7/2009 |
| JP | 2014146997 A | 8/2014 |
| JP | 2016163244 A | 9/2016 |

OTHER PUBLICATIONS

Runexy Corp, presentation for Devicelock Software, Jul. 2015, https://www.esector.co.jp/archives/event/esc/img/session_lunexy_b3.pdf.

*Primary Examiner* — Alex C Dunn
(74) *Attorney, Agent, or Firm* — Dinsmore & Shohl LLP

(57) ABSTRACT

An in-vehicle network system includes a relay apparatus and a first processor connected with the relay apparatus to be able to perform communication with the relay apparatus. The relay apparatus includes a first port for retrofitting a second processor and a second port for connecting a third processor that performs a communication setting process for the second processor connected at the first port.

9 Claims, 13 Drawing Sheets

(56) References Cited

U.S. PATENT DOCUMENTS

| | | | |
|---|---|---|---|
| 2009/0055626 A1* | 2/2009 | Cho | G06F 9/3897 712/29 |
| 2009/0132118 A1 | 5/2009 | Takeda | |
| 2012/0303397 A1* | 11/2012 | Prosser | H02J 7/342 705/7.12 |
| 2013/0044752 A1* | 2/2013 | Koponen | H04L 41/044 370/392 |
| 2014/0068717 A1* | 3/2014 | Mayes | G06F 21/44 726/3 |
| 2015/0288767 A1* | 10/2015 | Fargano | H04L 12/4625 709/227 |
| 2017/0078287 A1* | 3/2017 | Lee | H04W 12/06 |
| 2018/0131538 A1* | 5/2018 | Ando | H04L 12/40163 |
| 2018/0307286 A1* | 10/2018 | Jahagirdar | G06F 1/206 |

* cited by examiner

FIG.4

| PORT NUMBER | ADDRESS | GROUP | RECEPTION TYPE |
|---|---|---|---|
| — | SWITCH | Y | D |
| 1 | ECU 110-1 | Z | D |
| 2 | ECU 110-2 | Z | D |
| 3 | ECU 110-N | P | D |
| 4 | DCM | Z, P, X | D, A |
| 5 | — | — | — |
| 6 | — | — | — |

FIG.8

| PORT NUMBER | ADDRESS | GROUP | RECEPTION TYPE |
|---|---|---|---|
| – | SWITCH | Y | D |
| 1 | ECU 110-1 | Z | D |
| 2 | ECU 110-2 | Z | D |
| 3 | ECU 110-N | P | D |
| 4 | DCM | Z, P | D, A |
| 5 | PC | – | – |
| 6 | – | – | – |

FIG.9

| PORT NUMBER | ADDRESS | GROUP | RECEPTION TYPE |
|---|---|---|---|
| – | SWITCH | Y | D |
| 1 | ECU 110-1 | Z | D |
| 2 | ECU 110-2 | Z | D |
| 3 | ECU 110-N | P | D |
| 4 | DCM | Z, P | D, A |
| 5 | PC | Y | D |
| 6 | – | – | – |

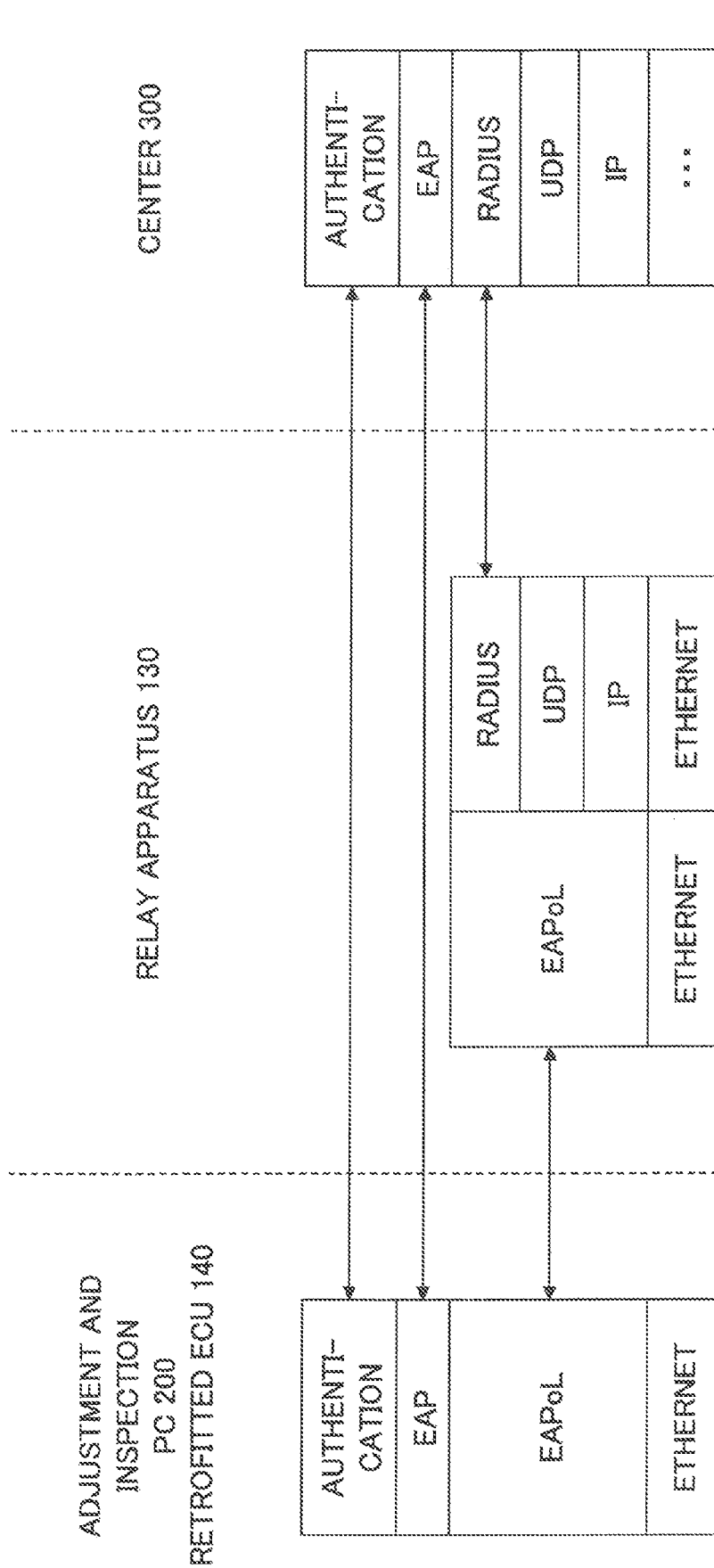

FIG. 10C
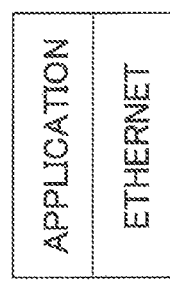
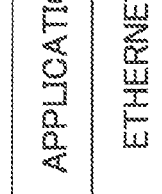

| PORT NUMBER | ADDRESS | GROUP | RECEPTION TYPE |
|---|---|---|---|
| – | SWITCH | Y | D |
| 1 | ECU 110-1 | Z | D |
| 2 | ECU 110-2 | Z | D |
| 3 | ECU 110-N | P | D |
| 4 | DCM | Z, P | D, A |
| 5 | PC | Y | D |
| 6 | RETROFITTED ECU | Y | D |

FIG.13

| RETROFITTED ECU 140 | GROUP |
|---|---|
| NAVIGATION ECU | Y |
| CRUISE CONTROL ECU | Z, P |
| RADAR CRUISE CONTROL ECU | Z, P |
| | |

FIG.14

| PORT NUMBER | ADDRESS | GROUP | RECEPTION TYPE |
|---|---|---|---|
| – | SWITCH | Y | D |
| 1 | ECU 110-1 | Z | D |
| 2 | ECU 110-2 | Z | D |
| 3 | ECU 110-N | P | D |
| 4 | DCM | Z, P | D, A |
| 5 | PC | Y | D |
| 6 | RETROFITTED ECU | P | D |

IN-VEHICLE NETWORK SYSTEM AND COMMUNICATION SETTING METHOD

CROSS-REFERENCE TO RELATED APPLICATION

The present application claims priority to Japanese Application No. 2018-011914, filed on Jan. 26, 2018, the entire contents of which are hereby incorporated by reference.

BACKGROUND

1. Technical Field

The present disclosure relates to an in-vehicle network system and a communication setting method.

2. Description of the Related Art

In a vehicle control unit in the related art for controlling a behavior of a control target in a vehicle, a communication interface for connecting the control unit with a communication system is provided separately from the control unit. The control unit includes a communication setting unit for adjusting a communication setting for the control unit to perform communication using the communication system (for example, see Japanese Laid-Open Patent Application No. 2009-161103).

SUMMARY

According to one aspect, an in-vehicle network system includes a relay apparatus; and a first processor connected with the relay apparatus to be able to perform communication with the relay apparatus. The relay apparatus includes a first port for retrofitting a second processor and a second port for connecting a third processor that performs a communication setting process for the second processor connected at the first port.

Other objects, features and advantages of the present disclosure will become more apparent from the following detailed description when read in conjunction with the accompanying drawings.

BRIEF DESCRIPTION OF THE DRAWINGS

FIG. 4 illustrates a management table stored in a memory of a relay apparatus;

FIG. 8 illustrates the management table at a time when the transmission-source address of the authentication Ethernet frame is registered;

FIG. 9 illustrates the management, table at a time when an authentication process of the adjustment and inspection PC is completed;

FIG. 10A illustrates protocol conversion;

FIG. 10C further illustrates protocol conversion of FIGS. 10A and 10B;

FIG. 13 illustrates a group database used in the process illustrated in FIG. 12; and FIG. 14 illustrates one example of the management table that has been changed through a communication setting.

DETAILED DESCRIPTION

Figure 1:
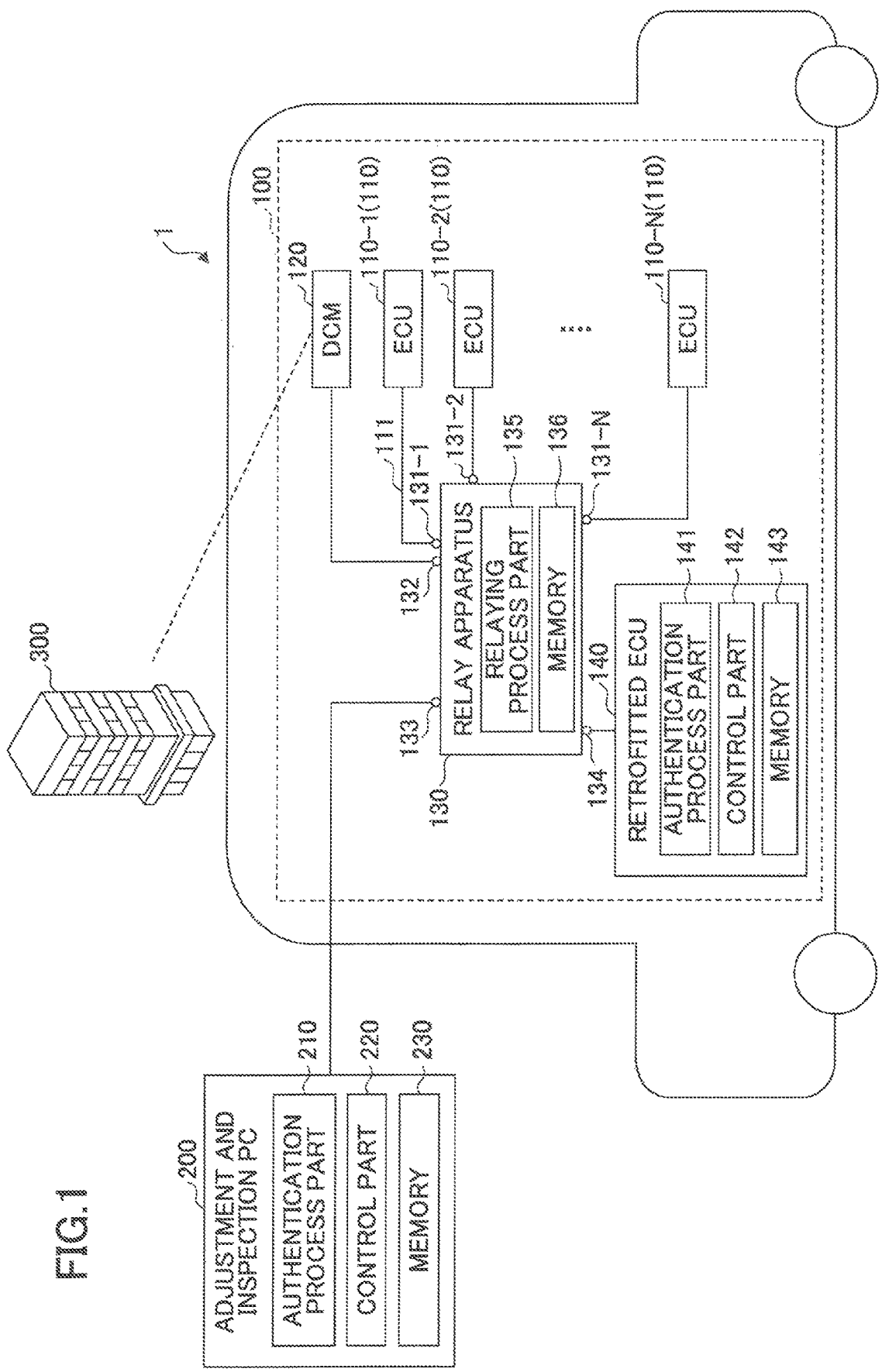
FIG. 1 illustrates an in-vehicle network system, an adjustment and inspection PC, and a center according to an embodiment.

In the related art described above, the vehicle control unit includes the communication setting unit; a sophisticated computer is needed for the communication setting unit to implement a communication setting. Moreover, a memory having a large storage capacity is needed to store a program and data for implementing a communication setting. Thus, the vehicle control unit in the related art requires resources for the communication setting unit to implement a communication setting.

An object of the present disclosure is to provide an in-vehicle network system where resources are saved.

An in-vehicle network system according to an embodiment of the present disclosure includes a relay apparatus and a first processor connected with the relay apparatus to be able to perform communication with the relay apparatus. The relay apparatus includes a first port for retrofitting a second processor and a second port for connecting a third processor that performs a communication setting process for the second processor connected at the first port.

Thus, it is possible to provide, outside the in-vehicle network system, the third processor that performs a communication setting process.

Therefore, it is possible to provide the in-vehicle network system where resources are saved.

An in-vehicle network system according to another embodiment of the present disclosure may further include a communication apparatus connected to the relay apparatus. The third processor may be configured to perform communication via the relay apparatus and the communication apparatus with a center that is connected with the communication apparatus to receive an authentication process. The second processor may be configured to perform communication with the center via the relay apparatus and the communication apparatus to receive an authentication process.

As a results it is possible for the in-vehicle network system to implement an authentication process through communication with the center via the communication apparatus.

Thus, it is possible to provide the in-vehicle network system where resources are saved and security is ensured.

In an in-vehicle network system according to yet another embodiment of the present disclosure, the third processor may be further configured to, in response to authenticating of the third processor and the second processor through the authentication processes, perform a communication setting process for the second processor.

As a result, it is possible to implement a communication setting process under the condition that the third processor and the second processor have been authenticated.

Thus, it is possible to provide the in-vehicle network system where a use of the second processor in a plug-and-play manner is implemented where resources are saved and security is ensured.

In an in-vehicle network system according to yet another embodiment of the present disclosure, the third processor may be further configured to perform the communication setting process under the condition that only the third processor, the relay apparatus and the second processor can perform communication with each other.

As a result, it is possible to implement a communication setting process where the first processor is not influenced by the communication setting process and security is ensured.

Thus, it is possible to provide the in-vehicle network system, where a use of the second processor in a plug-and-play manner is implemented where resources are saved and security is ensured.

In an in-vehicle network system according to yet another embodiment of the present disclosure, the relay apparatus may have a management database that defines specific apparatuses from among the first processor, the relay apparatus, the third processor, and the second processor with which the first processor, the relay apparatus, the third processor, and the second processor can perform communication. The third processor may be configured to set data of the management database through the communication setting process to define a specific apparatus with which the second processor can perform communication.

As a result, it is possible to set through the communication setting process a specific apparatus with which the second processor can perform communication.

Thus, it is possible to provide the in-vehicle network system where a use of the second processor in a plug-and-play manner is implemented where resources are saved and security is ensured.

In an in-vehicle network system according to yet another embodiment of the present disclosure, data of the management database indicating specific apparatuses with which the first processor, the relay apparatus, the third processor, and the second processor can perform communication may include data indicating a group that includes specific apparatuses from among the first processor, the relay apparatus, the third processor, and the second processor that can perform communication with each other.

As a result, it is possible to set through a communication setting process a group including specific apparatuses which can perform communication with each other.

Thus, it is possible to provide the in-vehicle network system where a use of the second processor in a plug-and-play manner is implemented where resources are saved and security is ensured.

An in-vehicle network system according to yet another embodiment of the present disclosure includes a relay apparatus and one processor that is connected with the relay apparatus to be able to perform communication with the relay apparatus. The relay apparatus includes a port for connecting another processor that performs a communication setting process for the one processor in response to updating of software or data in the one processor.

As a result, it is possible to provide, outside the in-vehicle network system, a processor that performs a communication setting process.

Therefore, it is possible to provide the in-vehicle network system where resources are saved.

Thus, according to the embodiments described above, it is possible to provide in-vehicle network systems where resources are saved.

Below, an embodiment applying an in-vehicle network system according to the present disclosure will be described.

<Embodiment>

FIG. 1 illustrates an in-vehicle network system 100, an adjustment and inspection PC (Personal Computer) 200, and a center 300 according to the embodiment. The in-vehicle network system 100 includes ECUs (Electronic Control Units) 110-1, 110-2, ..., and 110-N (where "N" denotes an integer greater than or equal to 3), a DCM (Data Communication Module) 120, a relay apparatus 130, and a retrofitted ECU 140.

The in-vehicle network system 100 is installed in a vehicle 1. To the relay apparatus 130 of the in-vehicle network system 100, the adjustment and inspection PC 200 is connected. The in-vehicle network system 100 performs communication with the center 300 with the use of the DCM 120 via a public line. In FIG. 1, the public line between the DCM 120 and the center 300 is indicated by a broken line. The center 300 is a data center where an information processing apparatus such as a server is installed. The server of the center 300 performs communication with in-vehicle network systems 100 installed in a plurality of vehicles. Note that the vehicle 1 is a HV (Hybrid Vehicle), a PHV (Plug in HV), an EV (Electric Vehicle), an engine vehicle, or the like.

The adjustment and inspection PC 200 is placed in a maintenance shop of a dealer or the like, and includes an authentication process part 210, a control part 220, and a memory 230. The adjustment and inspection PC 200 is connected to a port of the relay apparatus 130 for maintenance, inspection, repair, or the like of the vehicle 1 in which the in-vehicle network system 100 is installed. In addition, the adjustment and inspection PC 200 is connected to a port of the relay apparatus 130 for retrofitting the retrofitted ECU 140.

The adjustment and inspection PC 200 has a function of a diagnosis reader or the like required for maintenance, inspection, repair, or the like of the vehicle 1. In addition, the adjustment and Inspection PC 200 has a function to set up the retrofitted ECU 140. The function of the diagnosis reader or the like is implemented by the control part 220. The function to set up the retrofitted ECU 140 is implemented by the authentication process part 210 and the control part 220.

The authentication process part 210 and the control part 220 illustrated as functional blocks represent respective functions implemented by a program executed by the adjustment and inspection PC 200. The memory 230 functionally illustrated represents a memory of the adjustment and inspection PC 200.

Hereinafter, for a case where the ECU 110-1, 110-2, ..., and 110-N are not distinguished from each other, the ECU 110-1, 110-2, ..., and 110-N will be simply referred to as ECUs 110. An ECU 110 is one example of a first processor. The in-vehicle network system 100 includes, one or more ECUs 110 and may include: a plurality of relay apparatuses 130.

The ECU 110-1, 110-2, ..., and 110-N, the DCM 120, and the retrofitted ECU 140 are connected to the relay apparatus 130 via a bus 111, and are connected to each, other via the relay apparatus 130. The network using the relay apparatus 130 and the bus 111 is, for example, an in-vehicle LAN (Local Area Network) or the like, and, for example, conforms to an Ethernet (a registered trademark) standard.

Some of the ECUs 110-1, 110-2, . . . , and 110-N may be connected with sensors that detect information of the vehicle such as the vehicle speed, the accelerator position, and so forth.

The DCM 120 is a data communication apparatus used to perform communication with the center 300 via a mobile telephone network of LTE (Long Term Evolution), 5G (5th Generation), or the like, for example.

The relay apparatus 130 relays data among the ECU 110-1, 110-2, . . . , and 110-N, the DCM 120, and the retrofitted ECU 140, and may be regarded as a switch or a gateway.

The relay apparatus 130 includes ports 131-1, 131-2, . . . , 131-N, 132, 133, and 134, a relaying process part 135, and a memory 136. The ports 131-1, 131-2, . . . , 131-N, 132, 133, and 134 are receptacles in the relay apparatus 130 in each of which a communication line is inserted.

To the ports 131-1, 131-2, . . . , 131-N, and 132, the ECU 110-1, 110-2, . . . , and 110-N, and the DCM 120 are connected, respectively. The ports 131-1, 131-2, . . . , 131-N, and 132 are terminals to connect the ECUs 110 and the DCM 120.

To the ports 133 and 134, the adjustment and inspection PC 200 and the retrofitted ECU 140 can be connected, respectively. In this case, the port 133 is an example of a first port and the port 134 is an example of a second port.

The relaying process part 135 transfers Ethernet frames or authentication Ethernet frames among the ports 131-1, 131-2, . . . , 131-N, and 132. The memory 136 stores software or data required to transfer Ethernet frames or authentication Ethernet frames. Note that the relaying process part 135 illustrated as a functional block represents a function implemented by a program executed by the relay apparatus 130. The memory 136 functionally illustrated represents a memory of the relay apparatus 130.

The retrofitted ECU 140 is connected to the port 133 or 134 of the relay apparatus 130. The word "retrofitted" means that an apparatus is not installed in the in-vehicle network system 100 when the vehicle 1 in which the in-vehicle network system 100 is installed is shipped from a factory and is installed in the in-vehicle network system 100 after the vehicle 1 is shipped from the factory.

The retrofitted ECU 140 is, for example, a navigation ECU for a navigation unit, an ECU for cruise control, an ECU for radar cruise control, or the like. The retrofitted ECU 140 is one example of a second processor.

The retrofitted ECU 140 includes an authentication process part 141, a control part 142, and a memory 143. In response to a connection of the retrofitted ECU 140 to the port 133 or 134, an authentication process is performed between the authentication process part 141 and the center 300 via the relay apparatus 130 and the DCM 120. The control part 142 performs a control process, to implement a function (for example, a function of the navigation ECU) of the retrofitted ECU 140. The memory 143 stores software and data required by the authentication process part 141 and the control part 142 to perform processes.

Note that the authentication process part 141 and the control part 142 illustrated as functional blocks represent respective functions implemented by a program executed by the retrofitted ECU 140. The memory 143 functionally illustrated represents a memory of the retrofitted ECU 140.

The in-vehicle network system 100 performs communication of various data concerning ADAS (Advanced Driver-Assistance Systems) or smart keys (electronic keys). Therefore, high security is required in apparatuses that are connected to the ports 133 and 134. For this purpose, in response to a connection of an apparatus to the port 133 or 134, the in-vehicle network system 100 performs an authentication process and so forth ho determine whether the apparatus has been qualified by a manufacturing company of the vehicle 1.

After the retrofitted ECU 140 is authenticated and the adjustment and inspection PC 200 performs setting for communication, the retrofitted ECU 140 can be used under the condition that the retrofitted ECU 140 is connected to the in-vehicle network system 100.

Figure 2:
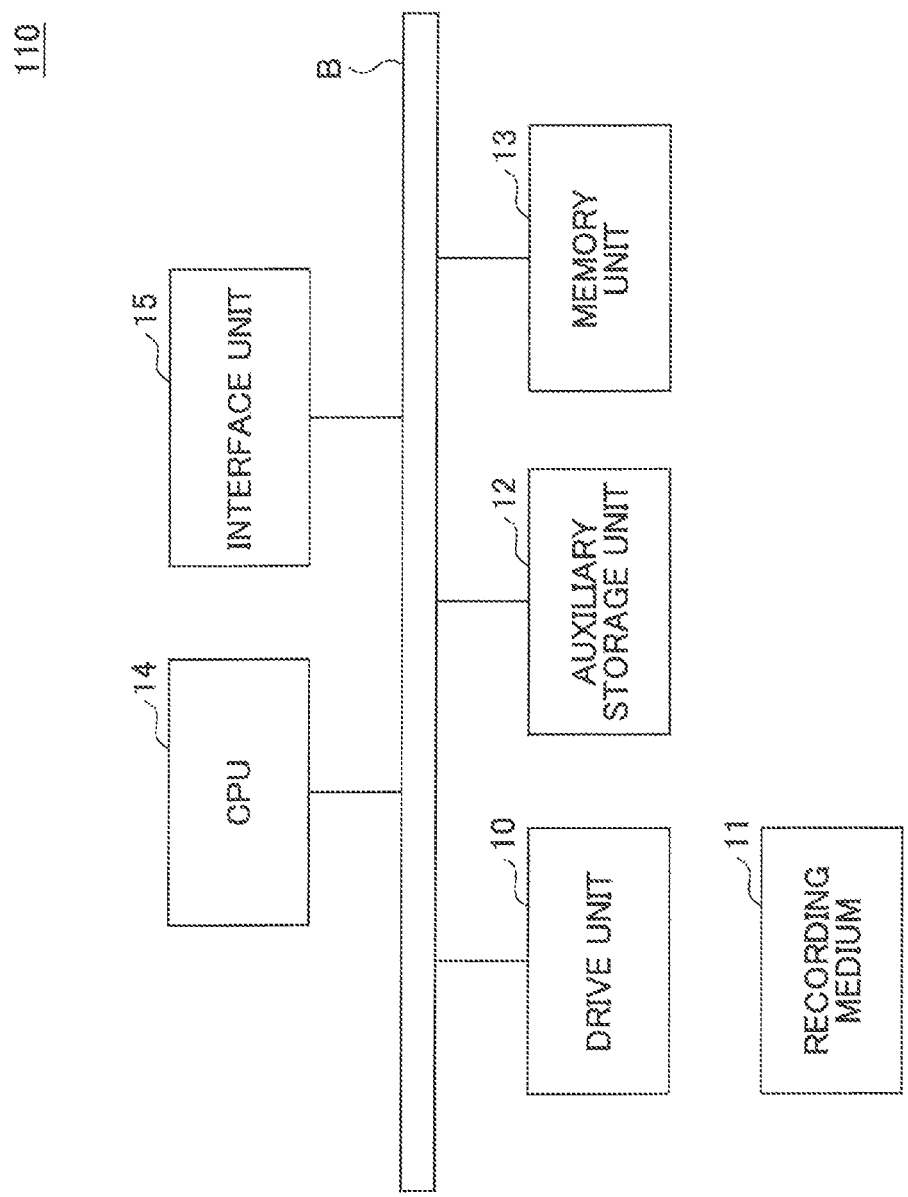
FIG. 2 illustrates a hardware configuration example of an ECU according to the embodiment.

FIG. 2 illustrates a hardware configuration example of an ECU 110 according to the embodiment. The ECU 110 includes a drive unit 10, an auxiliary storage unit 12, a memory unit 13, a CPU 14, and an interface unit 15 that are connected by a bus B with each other.

An information processing program configured to implement processes in the ECU 110 is provided from, for example, a recording medium 11. In response to the recording medium 11 where the information processing program is recorded being set in the drive unit 10, the information processing program is installed in the auxiliary storage unit 12 from the recording medium 11 via the drive unit 10. In this regard, installing of the information processing program is not necessarily performed by using the recording medium 11, and the information processing program may be downloaded from another computer via a network. The auxiliary storage unit 12 stores the installed information processing program, and stores necessary files, data, and so forth.

The memory unit 13 is, for example, a RAM (Random Access Memory). In response to an input of an instruction to start a program, the program is read from the auxiliary storage unit 12 and is stored in the memory unit 13. The CPU 14 implements a function concerning the ECU 110 according to the program stored in the memory unit 13. The interface unit 15 is used as an interface for connecting to a network.

Examples of the recording medium 11 include portable recording media such as a CD-ROM, a DVD, and a USB memory. Examples of the auxiliary storage unit 12 include a HDD (Hard Disk Drive) and a flash memory. The recording medium 11 and the auxiliary storage unit 12 each correspond to computer readable recording media.

The hardware configuration example of an ECU 110 has been described with reference to FIG. 2; the relay apparatus 130, the retrofitted ECU 140, and the adjustment and inspection PC 200 have similar or identical hardware configurations.

Figure 3:
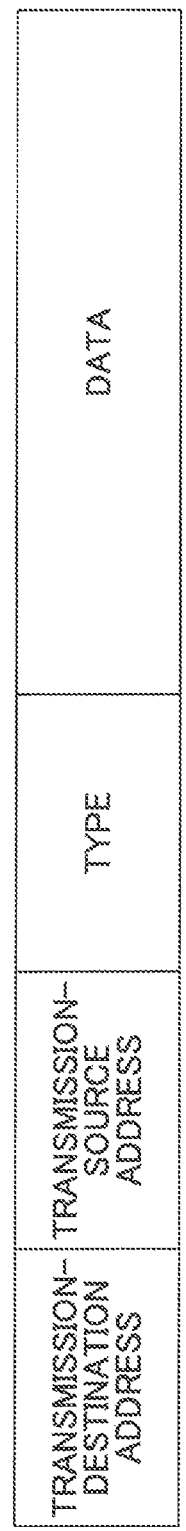
FIG. 3 illustrates a configuration of an Ethernet frame.

FIG. 3 illustrates a configuration of an Ethernet frame. An Ethernet frame is communication data in the in-vehicle network system 100, and includes a transmission-destination address, a transmission-source address, a type, and data. A "transmission-destination address" and a "transmission-source address" are addresses of a transmission destination and a transmission source, respectively.

A "type" indicates a communication purpose of "data" included in the Ethernet frame. For example, a "type" is used to identify whether "data" included in the Ethernet frame is for the purpose of data transmission and reception or for the purpose of authentication, for example.

FIG. 4 illustrates a management table stored in the memory 136 of the relay apparatus 130. The management is data in a table format and is used by the relay apparatus 130 when the relay apparatus 130 relays an Ethernet frame or an authentication Ethernet frame. The management table includes respective data pieces, i.e., a port number, an address, a group, and a reception type. The relay apparatus 130 relays an Ethernet frame or an authentication Ethernet frame according to descriptions in the management table. The management table is one example of a management database.

A data piece "port number" indicates a number allocated to each of the ports 131-1, 131-2, ..., 131-N, 132, 133, and 134 illustrated in FIG. 1. For example, the port numbers of the port 131-1, 131-2, 131-N, 132, 133, and 134 are 1-6, respectively.

A data piece "address" is the address of each of the relay apparatus 130 (switch), the ECU 110-1, 110-2, and 110-N, and DCM 120, and may be represented by a corresponding ID (identifier). In FIG. 4, for the purpose of simplification, concerning ECUs 110, the addresses of the ECU 110-1, 110-2, and 110-N are included.

A data piece "group" indicates an identifier of each of groups to which the ECU 110-1, 110-2, and 110-N, the DCM 120, and the relay apparatus 130 are grouped.

A data piece "reception type" indicates a type of each of Ethernet frames that the: apparatuses having the addresses described in the management table receive (in this regard, see FIG. 3), h plurality of data pieces for "reception type" may be included in a single record of the management table.

The relay apparatus 130 reads the management table to determine whether it is possible to transfer an Ethernet frame received at a port 131-1, 131-2, ..., 131-N, 132, 133, or 134.

Figure 5:
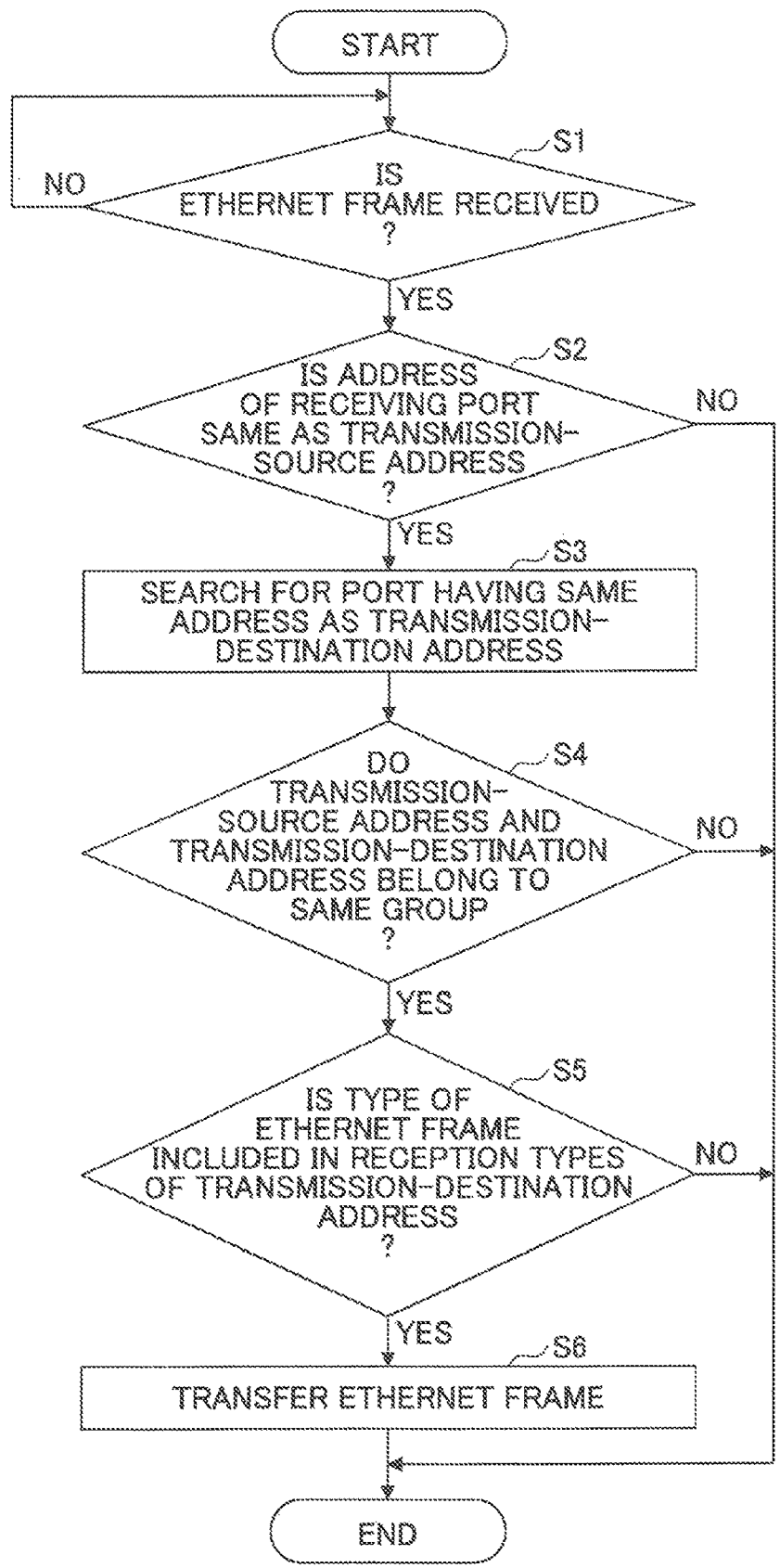
FIG. 5 is a flowchart illustrating filtering operations in a relaying process of the relay apparatus.

Next, filtering operations in a relaying process of the relay apparatus 130 will be described. FIG, 5 is a flowchart illustrating filtering operations in a relaying process of the relay apparatus 130. Filtering operations in FIG. 5 are performed by the relaying process part 135.

After starting the process, the relaying process part 135 determines whether an Ethernet frame has been received (step S1). The relaying process part 135 repeats step S1 at a predetermined cycle until an Ethernet frame is received.

In response to receiving an Ethernet frame (YES in step S1), the relaying process part 135 reads the management table to determine whether the address corresponding to the port at which the Ethernet frame has been received is the same as the transmission-source address included In the received Ethernet frame (step S2).

In response to determining that the address corresponding to the receiving port is the same as the transmission-source address (YES in step S2), the relaying process part 135 reads the management table to search for a port having the same address as the transmission-destination, address included in the received Ethernet frame (step S3). Note that the Ethernet frame should be transferred by using the port having the same address as the transmission-destination address included in the received Ethernet frame.

After obtaining the port having the same address as the transmission-destination address from the management table, the relaying process part 135 reads the management table to determine whether the group of the port having the transmission-source address of the received Ethernet frame is the same as the group of the port having the transmission-destination address of the received Ethernet frame (step S4).

For a case of determining that the respective groups are the same as one another (YES in step S4), the relaying process part 135 determines whether the type of the received Ethernet frame is included in the reception types of the port having the transmission-destination address (step S5). In this regard, whether the type of the received Ethernet frame is included in the reception types of the port having the transmission-destination address means whether the type of the received Ethernet frame is the same as any one of the one or more types registered as the reception types of the port having the transmission-destination address.

In response to determining that the type of the received Ethernet frame is included in the reception types of the port having the transmission-destination address (YES in step S5), the relaying process part 135 transfers the Ethernet frame to the transmission-destination address (step S6).

The relaying process part 135 thus ends the sequence of filtering operations. The relaying process part 135 repeats the filtering operations. Note that, in response to having a determination result NO in any one of steps S1, S2, S4, and S5, the relaying process part 135 returns to step S1 to repeat the sequence of filtering operations.

An example of determination by the relay apparatus 130 as to whether it is possible to transfer a received Ethernet frame in the above-described filtering operations in a relaying process will now be described for a case where the transmission-destination address and the transmission-source address of the Ethernet frame received at the port (YES in step S1) having the port number: 2 (simply referred to as "port 2" hereinafter) are "ECU 110-1" and "ECU 110-2", respectively, and the type of the Ethernet frame is "D" (Data).

First, the relaying process part 135 reads the management table to determine that the address (i.e., ECU 110-2) corresponding to the port 2 at which the Ethernet frame has been received is the same as the transmission-source address of the Ethernet frame (YES in step S2).

Next, the relaying process part 135 reads the management table to search for the port having the same address as the transmission-destination address (i.e., ECU 110-1) of the Ethernet frame (step S3). The port having the same address as the transmission-destination address of the Ethernet frame is the port having the port number: 1 (hereinafter, simply referred to as "port 1"). Therefore, the relaying process, part 135 determines that the received Ethernet frame should be transferred by using the port 1.

Next, the relaying process part 135 reads the management table to determine whether the transmission-source address (i.e., ECU 110-2) and the transmission-destination address (i.e., ECU 110-1) of the Ethernet frame belong to the same group (step S4). According to the management table illustrated in FIG. 4, the transmission-source address and the transmission-destination address belong to the same group "Z".

As a result of the transmission-source address and the transmission-destination address belonging to the same group Z (YES in step S4), the relaying process part 135 further reads the management table to determine whether the type "D" of the Ethernet frame is included in the reception types of the port having the transmission-destination address (i.e., ECU 110-1) (step S3).

According to the management table of FIG. 4, the reception types of the port 1 having the transmission-destination address ECU 110-1 is "D". Therefore, it can be determined that the type of the Ethernet frame is included or the same as the reception type of the port having the transmission-destination address (YES in step S5).

Thus, all of the conditions of steps S1, S2, S4, and S5 are satisfied. As a result, the relaying process part 135 transfers the received Ethernet frame to the transmission-destination address. In this regard, for a case where at least any one of the conditions of steps S1, S2, S4, and S5 is not satisfied, the relaying process part 135 does not transfer the received Ethernet frame and discards the received Ethernet frame. Thus, the filtering operations in a relaying process of the relaying process part 135 have been described.

Next, frame transfer operations of the relay-apparatus 130 of the in-vehicle network system 100 at a time of authentication will be described.

Figure 6:
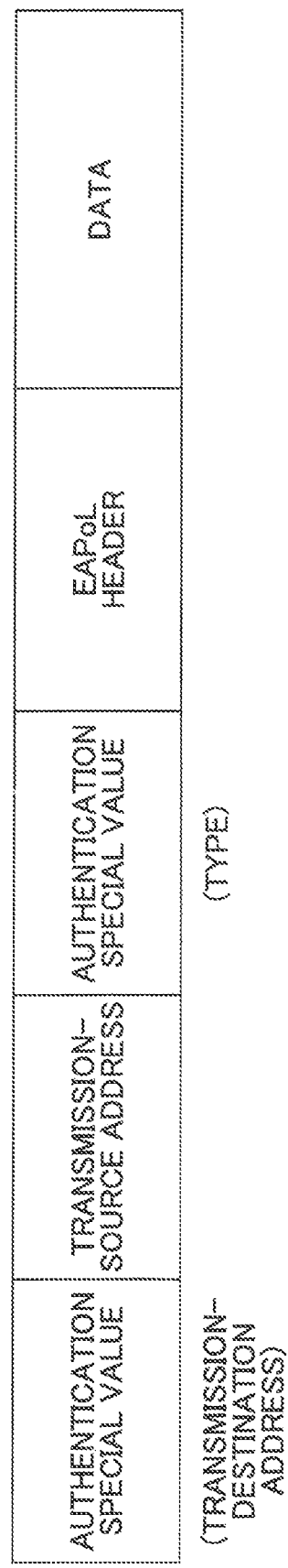
FIG. 6 illustrates a configuration of an authentication Ethernet frame.

FIG. 6 illustrates a configuration of an authentication Ethernet frame. An authentication Ethernet frame is an Ethernet frame that the adjustment and inspection PC 200 or the retrofitted ECU 140 outputs in response to a connection to the port 133 or 134. A case where the adjustment and inspection PC 200 is connected to the port 133 will now be described.

An authentication Ethernet frame includes an authentication special value of a transmission-destination address, a transmission-source address, an authentication special value of a type, an EAPoL header, and data. The format of an authentication Ethernet frame is basically the same as the format of an Ethernet frame illustrated in FIG. 3; an authentication special value is described as a transmission-destination address and an authentication special value is described as a type.

For example, for a case where authentication in conformity with the IEEE 802.1x standard is performed, an authentication special value is described as a transmission-destination address and an authentication special value is described as a type. As a transmission-source address, an address value indicating the address of the adjustment and inspection PC 200 is described.

For a case where authentication in conformity with the IEEE 802.1x standard is performed, before the "data" of an authentication Ethernet frame, data called an "EAPoL header" is inserted. An EAPoL header is a code indicating a process of an authentication procedure that the "data" subsequent to the EAPoL header relates to.

Figure 7:
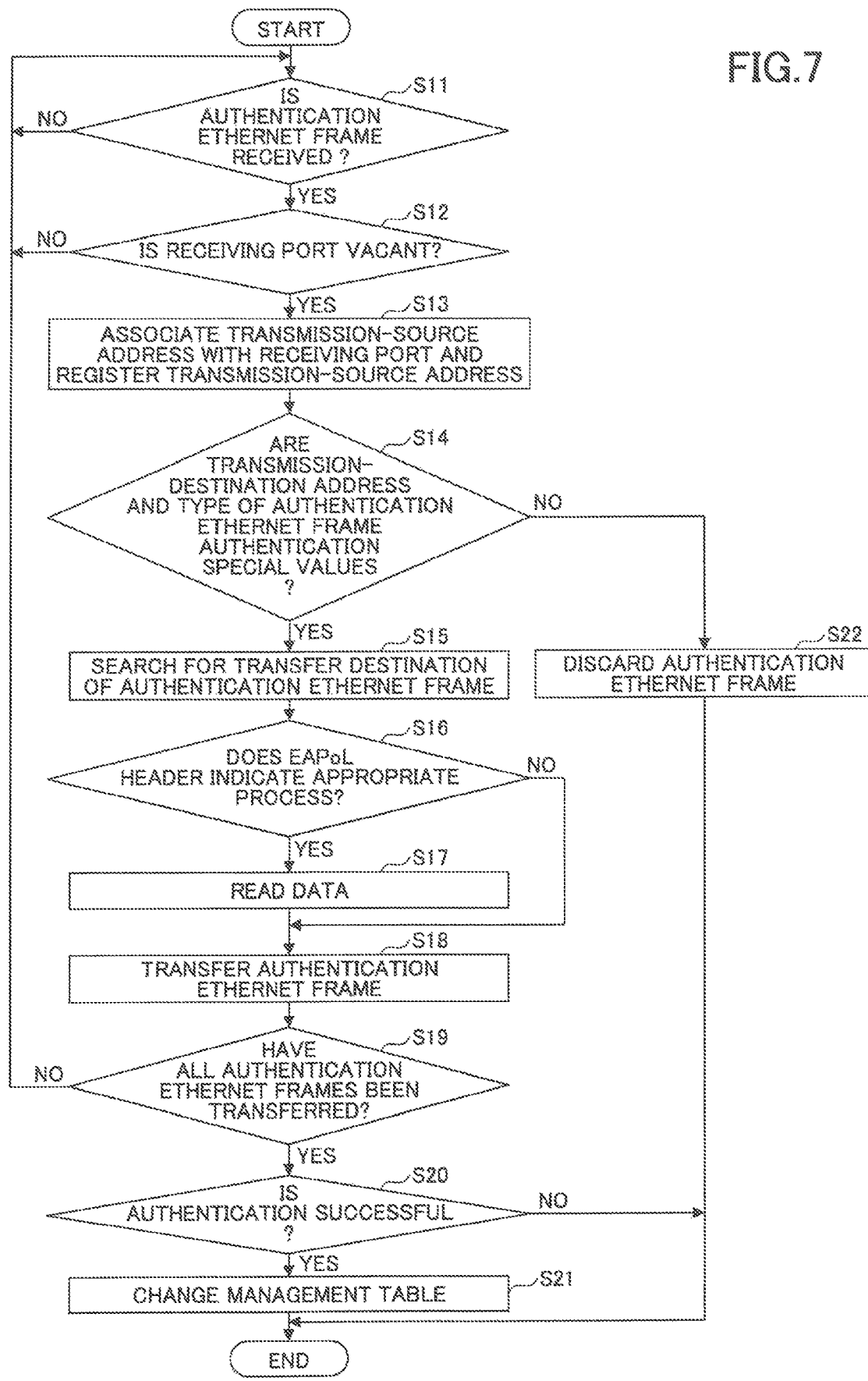
FIG. 7 is a flowchart illustrating a process for a case where an authentication Ethernet frame is received in a relaying process of the relay apparatus.

FIG. 7 is a flowchart illustrating a process for when, in a relaying process of the relay apparatus 130, an authentication Ethernet frame has been received. The process illustrated in FIG. 7 is performed by the relaying process part 135 in parallel with the process illustrated in FIG. 5.

The relaying process part 135 determines whether an authentication Ethernet frame has been received (step S11).

In this regard, in a case where the adjustment and inspection PC 200 receives an authentication process, the adjustment and inspection PC 200 outputs an authentication Ethernet frame in response to a connection to a vacant port 133 or 134 of the relay apparatus 130.

The adjustment and inspection PC 200 transmits an authentication Ethernet frame to and receives an authentication Ethernet frame from the center 300 via the relay apparatus 130 and the DCM 120. Therefore, there is a case where the relay apparatus 130 receives an authentication Ethernet frame from the adjustment and inspection PC 200 and a case where the relay apparatus 130 receives an authentication Ethernet frame from the center 300.

The reason why the adjustment and inspection PC 200 is connected with the center 300 via the DCM 120 for receiving an authentication process is that a connection destination of the DCM 120 is approximately fixed to the center 300, a likelihood of being connected to another apparatus than the center 300 is low, and therefore, a route passing through the DCM 120 is a highly safe route for performing an authentication process. The same reason is applied also to a case where the retrofitted ECU 140 receive an authentication process.

In response to a connection of the retrofitted ECU 140 to a vacant port 133 or 134, the retrofitted ECU 140 outputs an authentication Ethernet frame in the same way as the case of the adjustment and inspection PC 200. In this regard, the retrofitted ECU 140 transmits an Ethernet frame to and receives an Ethernet frame from the center 300 via the relay apparatus 130 and the DCM 120. Therefore, there is a case where the relay apparatus 130 receives an authentication Ethernet frame from the retrofitted ECU 104 and a case where the relay apparatus 130 receives an authentication Ethernet frame from the center 300.

Returning to FIG. 7, in response to determining that the relaying process part 135 has received an authentication Ethernet frame (YES in step S11), the relaying process part 135 reads the management table to determine whether the port at which the authentication Ethernet frame has been received is a vacant port (step S12). The vacant ports are those having the port numbers 5 and 6 (i.e., the ports 133 and 134), and are not associated with, i.e., do not have addresses in the management table.

In response to determining that the port at which the authentication Ethernet frame has been received is a vacant port (YES in step S12), the relaying process part 135 registers the transmission-source address of the authentication Ethernet frame as the address of the port at which the authentication Ethernet frame has been received (step S13).

The relaying process part 135 then determines whether the transmission-destination address and the type of the authentication Ethernet frame are both authentication special values (step S14).

In response to determining that the transmission-destination address and the type of the authentication Ethernet frame are both authentication special values (YES in step S14), the relaying process part 135 reads the management table to search for a transfer destination of the authentication Ethernet frame (step S15). A specific method of searching for a transfer destination of an authentication Ethernet frame will be described later in the description of a specific example of operations for a case where the relay apparatus 130 has received an authentication Ethernet frame in a relaying process.

Next, the relaying process part 135 determines whether the EAPoL header of the authentication Ethernet frame indicates an appropriate process of an authentication procedure (step S16). An appropriate process means, for example, for a case where authentication in conformity to the IEEE 802.1x standard is performed, a process that is performed in accordance with the IEEE 802.1x standard step by step in the legitimate order.

The relaying process part 135, for example, previously stores data of a process that is performed in accordance with the IEEE 802.1x standard step by step in the legitimate order in the memory 136. In step S16, the relaying process part 135 compares the process indicated by the EAPol header of the received Ethernet frame with the data stored in the memory 136.

In response to determining that the EAPoL header indicates an appropriate process of an authentication procedure (YES in step S16), the relaying process part 135 reads the EAPoL header and subsequent data of the authentication Ethernet frame to be relayed (step S17).

Next, the relaying process part 135 transfers, i.e., relays the authentication Ethernet frame to the transmission-destination address (step S18).

The relaying process part 135 then determines whether all of the authentication Ethernet frames have been transferred (step S19).

In response to determining that all of the authentication Ethernet frames have been transferred (YES in step S19), the relaying process part 135 determines on the basis of the data read in step S17 whether the authentication is successful (step S20). In this regard, it is determined that the authentication is successful in a case where the "data" of an authentication Ethernet frame received from the center 300 that is read in step S17 indicates that the authentication is successful.

In response to determining that the authentication is successful (YES in step S20), the relaying process part 135 changes the corresponding group and reception type in the management table to a group and a type enabling an identifying process and a setting process (step S21). In other words, because the authentication is successful, the corresponding group and reception type are thus appropriately set to prepare for an identifying process and a setting process to be performed subsequently.

For a case where the authentication process has been performed on the adjustment and inspection PC 200 in the process of FIG. 7, the group and the reception type associated with the port to which the adjustment and inspection PC 200 is connected in the management table are changed to a group and a reception type enabling an identifying process and a setting process in step S21.

For a case where the authentication process has been performed on the retrofitted ECU 140 in the process of FIG. 7, the group and the reception type associated with the port to which the retrofitted ECU 140 is connected in the management table sire changed to a group and a reception type enabling an identifying process and a setting process in step S21.

A group and a reception type enabling an identifying process and a setting process are the same as the group and the reception type of the relay apparatus 130. Thus, it is possible to implement transmission and reception of Ethernet frames for an identifying process and a setting process between the adjustment and inspection PC 200 and the relay apparatus 130 or between the retrofitted ECU 140 and the relay apparatus 130.

The relaying process part 135 thus ends the process in response to receiving an authentication Ethernet frame in a relaying process. The relaying process part 135 performs the process illustrated in FIG. 7 repeatedly.

Note that, for a case where the determination result of any one of steps S11, S12, and S19 is NO, the process returns to step S11 so that the sequence of operations will be repeated.

For a case where the relaying process part 135 determines in step S14 that at least either one of the transmission-destination, address and the type of the authentication Ethernet frame is not an authentication special value (NO in step S14), the relaying process part 135 does not transfer the received authentication Ethernet frame and discards the received, authentication Ethernet frame (step S22).

In response to finishing step S21, the relaying process part 135 ends the sequence of operations ("END"). For a case where the relaying process part 135 determines in step S16 that the EAPoL header does not indicate an appropriate process of an authentication procedure (NO in step S16), the relaying process part 135 skips step S17 and proceeds to step S18 for transferring the Ethernet frame to the center 300 without reading the data.

For a case where the relaying process part 135 determines in step S20 that the authentication is not successful (NO in step S20), the relaying process part 135 ends the sequence of operations ("END").

Next, the above-mentioned specific example of operations for a case where the relay apparatus 130 has received an authentication Ethernet frame in a relaying process will be described. In this specific example, in a case where the management table illustrated in FIG. 4 is present, the adjustment and inspection PC 200 is connected to the vacant port 5 (i.e., the port having the port number: 5, corresponding to the port 133 in FIG. 1), the transmission-destination address included in the authentication Ethernet frame received at the port 5 (i.e., the port 133) is an authentication special value, the transmission-source address is "PC", and the type is an authentication special value.

In response to receiving the authentication Ethernet frame (YES in step S11), the relaying process part 135 reads the management table to determine whether the port 5 at which the authentication Ethernet frame has been received is a vacant port (step S12).

Because the port 5 is a vacant port (YES in step S12), the relaying process part 135 registers, with the management table illustrated in FIG. 4, the transmission-source address "PC" of the authentication Ethernet frame as the address of the port 5 (step S13). As a result, the management table has been changed to have the values illustrated in FIG. 8.

FIG. 8 illustrates the management table after the transmission-source address ("PC", i.e., the address of the adjustment and inspection PC 200) of the authentication Ethernet frame has been thus registered. As illustrated in FIG. 8, the transmission-source address "PC" is registered for the port 5, where the group and the reception type have no values, respectively.

Next, the relaying process part 135 reads the transmission-destination address and the type of the received authentication Ethernet frame. Because both of the transmission-destination address and the type are authentication special values (YES in step S14), the relaying process part 135 searches the management table of FIG. 8 for a transfer destination of the authentication Ethernet frame (step S15).

Assuming that the reception type of a port at which an authentication Ethernet frame is received is set as "A" (i.e., "authentication") the port 4 (i.e., the port having the port number: 4, corresponding to the port 132) has a reception type "A" in the management table of FIG. 8 and has the DCM 120 connected.

Therefore, the relaying process part 135 determines the transfer destination of the received authentication Ethernet frame as the port 4.

Assuming that the EAPoL header indicates an appropriate process of an authentication procedure (YES in step S16), the relaying process part 135 transfers the received authentication Ethernet frame by using the port 4 (step S18). In this regard, for a case where the type of the authentication Ethernet frame has an authentication special value indicating authentication in conformity with the IEEE 802.1x standard, the relaying process part 135 performs protocol conversion in conformity with the IEEE 802.1 standard and thereafter transfers the authentication Ethernet frame by using the port 4.

At this stage, the adjustment and inspection PC 200 performs authentication communication with the center 300 via the relay apparatus 130 and the DCM 120. In the authentication communication, the relay apparatus 130 transfers authentication Ethernet frames between the adjustment and inspection PC 200 and the center 300.

In the authentication communication, the adjustment and inspection PC 200 transmits an authentication Ethernet frame that includes an ID, a password, a certificate, and so forth for authentication, to the center 300. The center 300 determines that the authentication is successful for a case of having determined that the received ID, password, certificate, and so forth for authentication are the same as those already registered with the center 300.

In order to obtain the result of authentication performed by the center 300, the relaying process part 135 reads the EAPoL header and the subsequent data of an authentication Ethernet frame at a time of relaying the authentication Ethernet frame. For a case where the authentication is successful, the relaying process part 135 changes the management table illustrated in FIG. 8 to have the values illustrated in FIG. 3.

FIG. 9 illustrates the management table at a time when the authentication process on the adjustment and inspection PC 200 has been completed. Specifically, the group and the reception type associated with the port 5 to which the adjustment and inspection PC 200 is connected are changed from those having no values to those having values enabling an identifying process and a setting process. In a setting process, the relay apparatus 130 itself is involved. Therefore, as illustrated in FIG. 9, the group to which the relay apparatus 130 belongs is registered as the group associated with the port 5.

In addition, in order to implement transmission and reception of Ethernet frames within the same group, as illustrated in FIG. 9, the reception type associated with the port 5 is set to have the same value "D" (i.e., "data") as the value of the reception type of the relay apparatus 130 (i.e., "SWITCH"). As mentioned above, the authentication is successful in this case, and therefore, the group and the reception type are thus changed to enable an identifying process and a setting process to be performed subsequently. As a result, the adjustment and inspection PC 200 can perform communication with the relay apparatus 130.

Thus, the authentication process performed by the relaying process part 135 for the case where the adjustment and inspection PC 200 has been connected to the port 5 (the port 133) of the relay apparatus 130 that has been vacant until then has been described.

Figure 10B:
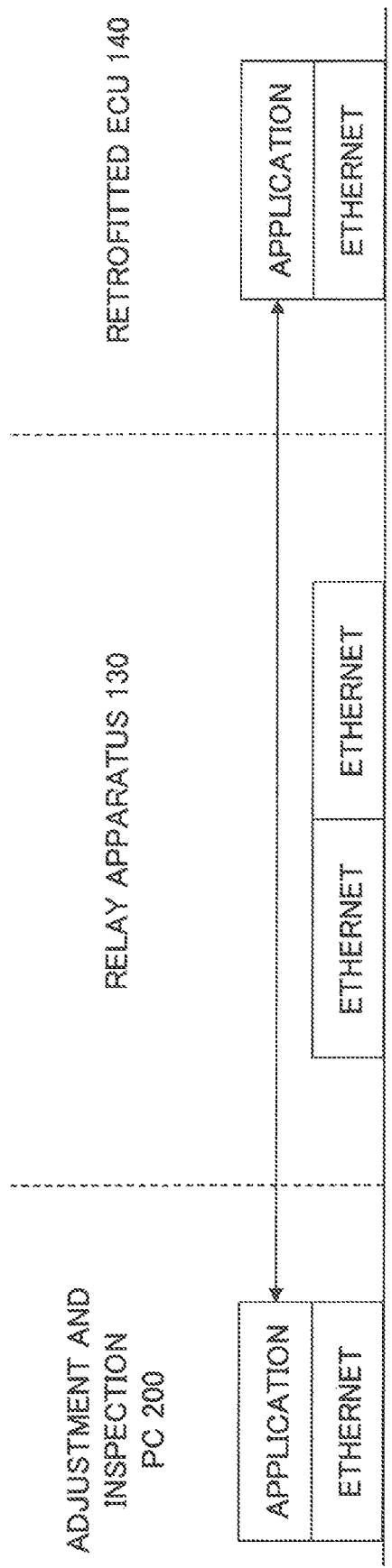
FIG. 10B further illustrates protocol conversion of FIG. 10A.

FIGS. 10A-10C illustrate a protocol conversion in conformity with the IEEE 802.1 standard.

As illustrated in FIG. 10A, the adjustment and inspection PC 200 and the retrofitted ECU 140 use an EAPoL (Extensible Authentication Protocol over LANs) header and an EAP in conformity with the IEEE 802.1x standard for a wireless LAN (Local Area Network) as Ethernet frame authentication protocols to be used with an authentication application.

The center 300 uses an IP (Internet Protocol), a UDP (User Datagram Protocol), a RADIUS (Remote Authentication Dial In User Service), and an EAP as protocols to be used with an authentication application.

When relaying an authentication Ethernet frame from the adjustment and Inspection PC 200 or the retrofitted ECU 140 to the center 300 and vice versa, the relaying process part 135 of the relay apparatus 130 performs a protocol conversion process to convert an EAPoL header to an IP, a UDP, and a RADIUS and vice versa, as illustrated in FIG. 10A.

In addition, the adjustment and inspection PC 200 or the retrofitted ECU 140 performs transmission and reception of Ethernet frames via the relay apparatus 130 using a dedicated application program that operates according to an Ethernet protocol, as illustrated in FIG. 10B.

Functions concerning transmission and reception of Ethernet frames in the authentication process part 210 and the control part 220 of the adjustment and inspection PC 200 are implemented by such an application. Functions concerning transmission and reception of Ethernet frames in the authentication process part 141 and the control part 142 of the retrofitted ECU 140 are implemented by such an application.

In addition, the adjustment and inspection PC 200 or the relay apparatus 130 performs transmission and reception of Ethernet frames using a dedicated application program that operates according to the Ethernet protocol, as illustrated in FIG. 10C.

Functions concerning transmission and reception of Ethernet frames in the authentication process part 210 and control part 220 of the adjustment and inspection PC 200 are implemented by such an application. Functions concerning transmission and reception of Ethernet frames in the relaying process part 135 of the relay apparatus 130 are implemented by such an application.

Thus, an authentication process on the adjustment and inspection PC 200 has been described. In this regard, the relay apparatus 130 performs an authentication process similar to the authentication process of FIG. 7 in response to a connection of the retrofitted ECU 140 to the port 6 (i.e., the port having the port number: 6, corresponding to the port 134) that has been vacant until then.

Figures 11, 12:
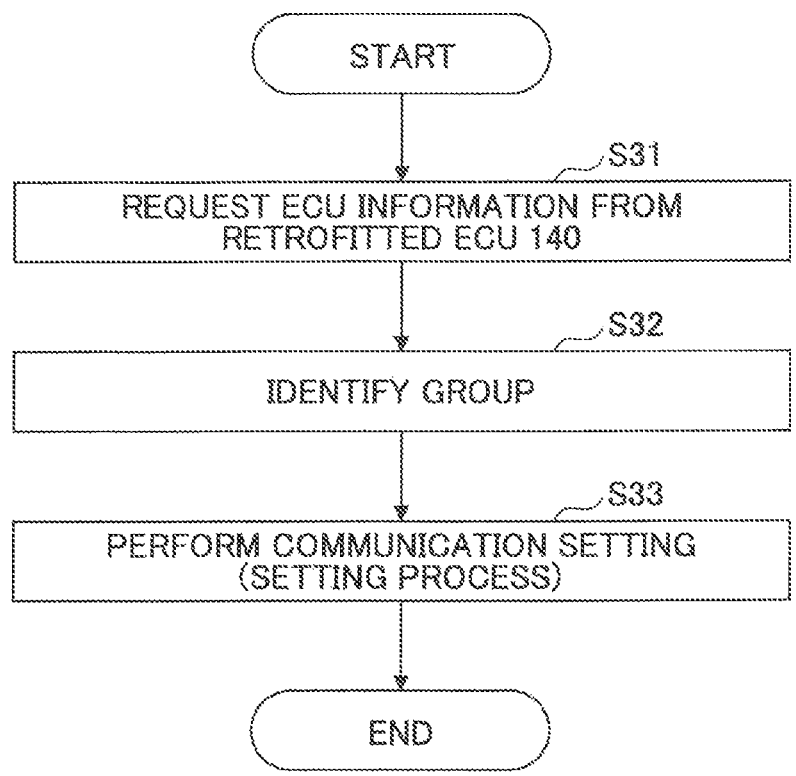
FIG. 11 illustrates the data in the management data at a time when both of the adjustment and inspection PC and a retrofitted ECU have been authenticated.
FIG. 12 is a flowchart illustrating an identifying process and a setting process performed by the adjustment and inspection PC.

In response to the authenticating of the retrofitted ECU 140 in addition to the authenticating of the adjustment and inspection PC 200, the management table is changed to have the values as illustrated in FIG. 11. FIG. 11 illustrates data of the management table for a case where the adjustment and inspection PC 200 and the retrofitted ECU 140 have been both authenticated. In the management table illustrated in FIG. 11, in comparison to the management table illustrated in FIG. 9, the group and the reception type of the retrofitted ECU 140 have been changed to be the same as those of the relay apparatus 130. As a result, it is possible to implement transmission and reception of Ethernet frames between the adjustment and inspection PC 200 and the retrofitted ECU 140 for implementing a communication setting for the retrofitted ECU 140 by the adjustment and inspection PC 200.

According to the management table illustrated in FIG. 11 where only the relay apparatus 130 and the retrofitted ECU 140 belong to the same group Y as that of the adjustment and inspection PC 200, the adjustment and inspection PC 200 can perform transmission and reception of Ethernet frames with only the relay apparatus 130 and the retrofitted ECU 140.

In the same way, according to the management table illustrated in FIG. 11 where only the relay apparatus 130 and the adjustment and inspection PC 200 belong to the same group Y as that of the retrofitted ECU 140, the retrofitted ECU 140 can perform transmission and reception of Ethernet frames with only the relay apparatus 130 and the adjustment and inspection PC 200. At this time, the retrofitted ECU 140 still cannot perform transmission and reception of Ethernet frames with the ECU 110 and the DCM 120.

Next, operations of the relay apparatus 130 for a case where the adjustment and inspection PC 200 performs an identifying process and a setting process for the retrofitted ECU 140 will be described. An identifying process is a process of identifying the type of the retrofitted ECU 140 by the adjustment and inspection PC 200. The type of the retrofitted ECU 140 means, for example, an actual type of the retrofitted ECU 140 such as a navigation ECU for a navigation, unit, a ECU for cruise control, a ECU for radar cruise control, or the like; each type has an ID (Identifier). A setting process is a process of performing a communication setting for the retrofitted ECU 140 by the adjustment and inspection PC 200.

For the adjustment and inspection PC 200 to identify the retrofitted ECO 140, the relaying process part 135 of the relay apparatus 130 permits, according to the management table illustrated in FIG. 11, the adjustment and inspection PC 200 and the retrofitted ECU 140 to perform transmission and reception of Ethernet frames only between the adjustment and inspection PC 200 and the retrofitted ECU 140 via the relay apparatus 130 and between the adjustment and inspection PC 200 or the retrofitted ECU 140 and the relay apparatus 130.

FIG. 12 is a flowchart illustrating an identifying process and a setting process performed by the adjustment and inspection PC 200. FIG. 13 illustrates a group database used by the process illustrated in FIG. 12. The group database is stored in the memory 230 of the adjustment and inspection PC 200.

First, the group database of FIG. 13 will be described. The group database illustrated in FIG. 13 is data associating a type of the retrofitted ECU 140 with a group. In such, a group database, a type of the retrofitted ECU 140 is associated with a group for each of functions that can be retrofitted to the vehicle 1. Note that the term "group" means a group included in the management tables illustrated in FIGS. 4, 8, 9, and 11.

As illustrated in FIG. 13, the group of the navigation ECU is Y, the groups of the ECU for cruise control are Z and P, and the groups of the ECU for radar cruise control are Z and P.

Returning to FIG. 12, in an identifying process, the control part 220 of the adjustment and inspection PC 200 requests from the retrofitted ECU 140 data indicating a product ID, a software version, a function (i.e., the function of the retrofitted ECU 140), and so forth as ECU information (step S31). As illustrated in FIG. 10B, the control part 220 uses an application that operates according to the Ethernet protocol to request from the retrofitted ECU 140 a product ID and so forth as ECU information.

In response to obtaining the ECO information from the retrofitted ECU 140, the control part 220 reads the group database illustrated in FIG. 13 to identify a group to which the retrofitted ECU 140 should belong on the basis of the obtained ECU information (step S32).

Next, the control part 220 performs a communication setting for the retrofitted ECU 140 using the data of the group that has been identified in step S32 (step 333). More specifically, in the communication setting for the retrofitted ECU 140, the control part 220 causes the relaying process part 135 of the relay apparatus 130 to perform a setting change of the management table.

For example, in a case where the management table that the relay apparatus 130 has includes the data illustrated in FIG. 11, the ECU 110-1, the ECU 110-2, and the DCM 120 belong to the group Z; and the ECU 110-N and the DCM 120 belong to the group P.

For a case where the group associated with the retrofitted ECU 140 according to the group database illustrated in FIG. 13 is P (as identified in step S32) according to the function included in the ECU information obtained in step S31, the adjustment and inspection PC 200 causes the relaying process part 135 of the relay apparatus 130 to perform a setting change of the management table for the port 6 to belong to the group P.

As illustrated in FIG. 10C, the control part 220 of the adjustment and inspection PC 200 causes the relaying process part 135 of the relay apparatus 130 to perform the setting change of the management table using the application that operates according to the Ethernet protocol.

In the communication setting, the adjustment and inspection PC 200 sets the address of the relay apparatus 130 as the transmission-destination address of an Ethernet frame. For a case where the transmission-destination address included in a received Ethernet frame is the address of the relay apparatus 130, the relaying process part 135 of the relay apparatus 130 transmits the Ethernet frame to itself (i.e., to the relaying process part 135).

The relaying process part 135 of the relay apparatus 130 operates according to the contents of the data included in the received Ethernet frame. For example, for a case of having received an Ethernet, frame where a command to "add to the group P the port 6 connected to the retrofitted ECU 140" is written as the data from the control part 220 of the adjustment and inspection PC 200, the relaying process part 135 responds to the instruction to change the management table accordingly. The control part 220 of the adjustment and inspection PC 200 generates such a command by using the data of the group that is identified in step S32.

FIG. 14 illustrates one example of the management table having been changed through the communication setting. As illustrated in FIG. 14, the group associated with the address of the retrofitted ECU 140 has been changed from Y in FIG. 11 to P.

Through such a communication setting, the retrofitted ECU 140 comes to be able to perform transmission and reception of Ethernet frames with the ECU-N belonging to the same group P.

Through the above-described process, it is possible to bring the retrofitted ECU 140 connected to the in-vehicle network system 100 into a state of being able to operate. Thus, it is possible to provide the in-vehicle network system 100 where a use of the retrofitted ECU 140 in a plug-and-play manner is implemented while sufficient security is secured. Note that, when implementing of the communication setting has been finished, the task of the adjustment and inspection PC 200 ends, and therefore, the adjustment and inspection PC 200 can be removed from the relay apparatus 130.

According to the embodiment, thanks to a plug-and-play capability of the in-vehicle network system 100, even if a requirement, for example, to raise the level of security or increase the number of connectable apparatuses may arise in future, it is possible to flexibly satisfy the requirement without increasing the processing capability and/or the memory capacity of a microcomputer or the like of the in-vehicle network system 100.

Therefore, it is possible to provide the in-vehicle network system 100 where resources are saved. In comparison to a case of the related art where an in-vehicle system includes necessary software and data for a communication setting, there is no need to increase the processing capability of a microcomputer or the like and there is no need to increase the memory capacity according to the embodiment: thus, resources can be saved.

Moreover, under the condition that the adjustment and inspection PC 200 and the retrofitted ECU 140 have been authenticated, transmission and reception of Ethernet frames only between the adjustment and inspection PC 200 and the retrofitted ECU 140 via the relay apparatus 130 and between the adjustment and inspection PC 200 or the retrofitted ECU 140 and the relay apparatus 130 are permitted. Therefore, it is possible to implement a communication setting for the retrofitted ECU 140 while ensuring security of the network.

Through the communication setting, the adjustment and inspection PC 200 reads the group database to cause the retrofitted ECU 140 to belong to the group according to the type or the function of the retrofitted ECU 140. Therefore, it is possible to easily and precisely identify the group of the retrofitted ECU 140. Therefore, a use of the retrofitted ECU 140 in a plug-and-play manner can be implemented while security is ensured.

For example, in a non-in-vehicle network system such as a network system in an office, various devices may be used in a plug-and-play manner freely by connecting the devices to a USB (Universal Serial Bus). In contrast thereto, an in-vehicle network system, is installed in a vehicle, and therefore, it is essential to ensure safety. From this viewpoint, in an in-vehicle network system, it would be difficult to use various devices in a plug-and-play manner freely with the same configuration as a non-in-vehicle network system. In the presumption of being thus installed in the vehicle 1, the in-vehicle network system 100 according to the embodiment implements saving resources and a plug-and-play function under the condition that security is ensured.

The case where the relay apparatus 130, the retrofitted ECU 140, the adjustment and inspection PC 200, and the center 300 use the Ethernet protocol has been described. However, the in-vehicle network system 100 can be implemented in the same way also in a case where another protocol than the Ethernet protocol is used.

The case where the retrofitted ECU 140 is added to the in-vehicle network system 100 has been described. In this regard, it is also possible that, for a case where the group or the reception type associated with an existing ECU 110 is changed in a case where an application or firmware of the ECU 110 is updated, the group or the reception type may be changed in the management table accordingly.

In this case, the application or the firmware of the ECU 110 may be updated as a result of a corresponding communication setting being implemented under the condition that the groups and the reception types in the management table for the adjustment and inspection PC 200, the ECU 110, and the relay apparatus 130 have been set to the groups and reception types enabling the setting process (i.e., enabling the above-mentioned communication setting).

In addition, for a case where the group or reception type associated with the retrofitted ECU 140 is changed, in a case where an application or firmware of the retrofitted ECU 140 is updated, the group or reception type may be changed in the management table accordingly.

Thus, the embodiment where the group database is stored in the memory 230 of the adjustment and inspection PC 200 has been described. In this regard, it is also possible that the group database is included in a server in the center 300 and the adjustment and inspection PC 200 downloads the group database from the center 300. In this case, the adjustment and inspection PC 200 may download the group database from the center 300 via the DCM 120 or directly via the Internet or the like.

Thus, the in-vehicle network system and the communication setting method have been described as the illustrative embodiments. In this regard, the present disclosure is not limited to the specifically disclosed embodiments, and various modifications and/or changes may be made within the claimed scope.

The present application is based on and claims priority to Japanese patent application No. 2018-011914, filed Jan. 26, 2018, the entire contents of which are hereby incorporated herein by reference.

DESCRIPTION OF REFERENCE NUMERALS

1: vehicle
100: in-vehicle: network system
110-1, 110-2, . . . , 110-N: ECUs
120: DCM
130: relay apparatus
131-1, 131-2, . . . , 131-N, 132, 133, 134: ports
135: relaying process part
136: memory
140: retrofitted ECU
141: authentication process part
142: control part
143: memory
200: adjustment and inspection PC
300: center
210: authentication process part
220: control part
230: memory

What is claimed is:

1. An in-vehicle network system comprising:
a relay apparatus; and
a first processor connected with the relay apparatus to be able to perform communication with the relay apparatus, wherein
the relay apparatus includes:
a first port for retrofitting a second processor,
a second port for connecting a third processor that performs a communication setting process for the second processor connected at the first port,
a management database that defines specific apparatuses from among the first processor, the relay apparatus, the third processor, and the second processor with which the first processor, the relay apparatus, the third processor, and the second processor can perform communication, and
the third processor is further configured to set data of the management database through the communication setting process to define a specific apparatus with which the second processor can perform communication.

2. The in-vehicle network system as claimed in claim 1, further comprising a communication apparatus connected to the relay apparatus, wherein
the third processor is configured to perform communication with a center that is connected with the communication apparatus via the relay apparatus and the communication apparatus to receive an authentication process, and
the second processor is configured to perform communication with the center via the relay apparatus and the communication apparatus to receive an authentication process.

3. The in-vehicle network system as claimed in claim 2, wherein
the third processor is further configured to, in response to authenticating of the third processor and the second processor through the authentication processes, perform the communication setting process for the second processor.

4. The in-vehicle network system as claimed in claim 1, wherein
the third processor is further configured to perform the communication setting process under the condition that only the third processor, the relay apparatus and the second processor can perform communication with each other.

5. The in-vehicle network system as claimed in claim 2, wherein
the third processor is further configured to perform the communication setting process under the condition that only the third processor, the relay apparatus and the second processor can perform communication with each other.

6. The in-vehicle network system as claimed in claim 3, wherein
the third processor is further configured to perform the communication setting process under the condition that only the third processor, the relay apparatus and the second processor can perform communication with each other.

7. The in-vehicle network system as claimed in claim 1, wherein
data of the management database indicating specific apparatuses with which the first processor, the relay apparatus, the third processor, and the second processor can perform communication includes data indicating a group that includes specific apparatuses from among the first processor, the relay apparatus, the third processor, and the second processor that can perform communication with each other.

8. An in-vehicle network system comprising:
a relay apparatus; and
a first processor connected with the relay apparatus to be able to perform communication with the relay apparatus, wherein
the relay apparatus includes:
    a first port for connecting a second processor that performs a communication setting process for the first processor in response to updating of software or data in the first processor,
    a second port for connecting a third processor that performs a communication setting process for the second processor connected at the first port,
    a management database that defines specific apparatuses from among the first processor, the relay apparatus, the third processor, and the second processor with which the first processor, the relay apparatus, the third processor, and the second processor can perform communication, and
the third processor is further configured to set data of the management database through the communication setting process to define a specific apparatus with which the second processor can perform communication.

9. A communication setting method for an in-vehicle network system, wherein the in-vehicle network system includes:
a relay apparatus; and
a first processor connected to the relay apparatus,
wherein the relay apparatus includes:
    a first port for retrofitting a second processor; and
    a second port for connecting a third processor configured to perform a communication setting process for the second processor connected at the first port,
wherein the communication setting method comprises:
performing by the third processor the communication setting process under a condition that only the third processor, the relay apparatus, and the second processor can perform communication with each other.

* * * * *

UNITED STATES PATENT AND TRADEMARK OFFICE
CERTIFICATE OF CORRECTION

PATENT NO. : 10,981,523 B2
APPLICATION NO. : 16/256399
DATED : April 20, 2021
INVENTOR(S) : Tomokazu Moriya, Yoshinori Kakiya and Masakazu Hattori It is certified that error appears in the above-identified patent and that said Letters Patent is hereby corrected as shown below:

On the Title Page

Column 2, item (56), U.S. patent documents, cite no. 4, delete "Frail" and insert --Prall et al.--, therefor.

In the Specification

In Column 1, Line(s) 65, after "management", delete ",".

In Column 2, Line(s) 56, delete "results" and insert --result,--, therefor.

In Column 3, Line(s) 18, after "system", delete ",".

In Column 4, Line(s) 59, after "include", delete ":".

In Column 4, Line(s) 63, after "each", delete ",".

In Column 5, Line(s) 53, after "process", delete ",".

In Column 6, Line(s) 3, delete "ho" and insert --to--, therefor.

In Column 7, Line(s) 20, after "that the", delete ":".

In Column 7, Line(s) 22, after "FIG. 3)", delete ", h" and insert --. A--, therefor.

In Column 7, Line(s) 29, delete "FIG, 5" and insert --FIG. 5--, therefor.

In Column 8, Line(s) 35, after "process", delete ",".

In Column 8, Line(s) 52, delete "S3" and insert --S5--, therefor.

Signed and Sealed this
Twenty-seventh Day of July, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,981,523 B2

In Column 11, Line(s) 25, delete "sire" and insert --are--, therefor.

In Column 11, Line(s) 45, after "destination", delete ",".

In Column 11, Line(s) 49, after "received", delete ",".

In Column 12, Line(s) 61, after "authentication", delete ",".

In Column 13, Line(s) 6, delete "FIG. 3" and insert --FIG. 9--, therefor.

In Column 13, Line(s) 15, after "group", insert --"Y"--.

In Column 14, Line(s) 58, after "navigation", delete ",".

In Column 14, Line(s) 64, delete "ECO" and insert --ECU--, therefor.

In Column 15, Line(s) 14, after "such", delete ",".

In Column 15, Line(s) 33, delete "ECO" and insert --ECU--, therefor.

In Column 15, Line(s) 40, delete "333" and insert --S33--, therefor.

In Column 16, Line(s) 7, after "Ethernet", delete ",".

In Column 17, Line(s) 5, after "system", delete ",".

In Column 17, Line(s) 36, after "changed", delete ",".

In Column 17, Line(s) 63, after "in-vehicle", delete ":".